(12) United States Patent
Woodsum

(10) Patent No.: US 9,871,684 B2
(45) Date of Patent: Jan. 16, 2018

(54) DEVICES AND METHODS FOR HERMETIC TRANSFORM FILTERS

(71) Applicant: VertoCOMM, Inc., Weston, MA (US)

(72) Inventor: Harvey C. Woodsum, Bedford, NH (US)

(73) Assignee: VertoCOMM, Inc., Weston, MA (US)

( * ) Notice: Subject to any disclaimer, the term of this patent is extended or adjusted under 35 U.S.C. 154(b) by 0 days.

(21) Appl. No.: 14/944,034

(22) Filed: Nov. 17, 2015

(65) Prior Publication Data

US 2016/0142239 A1    May 19, 2016

Related U.S. Application Data

(60) Provisional application No. 62/080,621, filed on Nov. 17, 2014.

(51) Int. Cl.
*H04L 27/26* (2006.01)
*H04B 7/06* (2006.01)

(52) U.S. Cl.
CPC ....... *H04L 27/2639* (2013.01); *H04B 7/0617* (2013.01)

(58) Field of Classification Search
USPC .............................. 375/295; 455/296, 456.1
See application file for complete search history.

(56) References Cited

U.S. PATENT DOCUMENTS

| | | | |
|---|---|---|---|
| 4,338,605 A | 7/1982 | Mims | |
| 4,989,090 A | 1/1991 | Campbell et al. | |
| 5,479,176 A | 12/1995 | Zavrel, Jr. | |
| 5,583,884 A | 12/1996 | Maruyama et al. | |
| 5,892,847 A | 4/1999 | Johnson | |
| 5,933,537 A | 8/1999 | Hajjahmad et al. | |
| 6,101,399 A | 8/2000 | Raleigh et al. | |
| 6,185,440 B1 | 2/2001 | Barratt et al. | |
| 6,229,486 B1 | 5/2001 | Krile | |
| 6,317,612 B1 | 11/2001 | Farsakh | |
| 6,408,109 B1 | 6/2002 | Silver et al. | |
| 6,421,007 B1 | 7/2002 | Owen et al. | |
| 6,427,531 B1 | 8/2002 | Chintawongvanich | |

(Continued)

FOREIGN PATENT DOCUMENTS

CN    103153330 A    6/2013

OTHER PUBLICATIONS

Doblinger, G., "Beamforming with Optimized Interpolated Microphone Arrays," IEEE HSCMA Conference Proceedings, pp. 33-36 (2008).

(Continued)

*Primary Examiner* — Eva Puente
(74) *Attorney, Agent, or Firm* — Wilmer Cutler Pickering Hale & Dorr LLP

(57) ABSTRACT

In one or more exemplary embodiments, a method comprises applying one or more first hermetic filters to an interval of data to produce one or more first filtered subintervals of data, wherein the one or more first hermetic filters are constructed from a hermetic function for the interval; and applying one or more second hermetic filters to the one or more first filtered subintervals of data to produce one or more second filtered subintervals of data, wherein the one or more second hermetic filters are constructed from a hermetic function for the one or more first filtered subintervals.

17 Claims, 6 Drawing Sheets

(56) References Cited

U.S. PATENT DOCUMENTS

| | | |
|---|---|---|
| 6,876,693 B2 | 4/2005 | Sim |
| 6,943,732 B2 | 9/2005 | Gottl et al. |
| 6,947,470 B2 | 9/2005 | Berens |
| 7,012,978 B2 | 3/2006 | Talwar |
| 7,065,070 B1 | 6/2006 | Chang |
| 7,092,690 B2 | 8/2006 | Zancewicz |
| 7,103,537 B2 | 9/2006 | Witzgall et al. |
| 7,106,785 B2 | 9/2006 | Yoshida |
| 7,260,370 B2 | 8/2007 | Wang et al. |
| 7,280,627 B2 | 10/2007 | Orlin |
| 7,298,805 B2 | 11/2007 | Walton et al. |
| 7,415,711 B2 | 8/2008 | Chew et al. |
| 7,443,942 B2 | 10/2008 | Kouyama |
| 7,450,067 B2 | 11/2008 | Xin |
| 7,873,016 B2 | 1/2011 | Kim |
| 7,925,234 B2 | 4/2011 | Yeh et al. |
| 8,005,162 B2 | 8/2011 | Cai et al. |
| 8,036,287 B2 | 10/2011 | Hwang et al. |
| 8,064,408 B2 | 11/2011 | Woodsum |
| 8,363,704 B1 | 1/2013 | Rayburn |
| 8,433,804 B2 | 4/2013 | Swanburg et al. |
| 8,559,456 B2 | 10/2013 | Woodsum |
| 8,917,786 B1 | 12/2014 | von der Embse |
| 8,948,718 B2 | 2/2015 | Woodsum |
| 9,154,214 B2 | 10/2015 | Woodsum |
| 9,154,353 B2 | 10/2015 | Woodsum |
| 2002/0034215 A1 | 3/2002 | Inoue et al. |
| 2003/0039303 A1 | 2/2003 | Sriram |
| 2003/0216156 A1 | 11/2003 | Chun |
| 2004/0071200 A1 | 4/2004 | Betz et al. |
| 2004/0095990 A1 | 5/2004 | Gossett et al. |
| 2004/0120429 A1 | 6/2004 | Orlin |
| 2005/0101253 A1 | 5/2005 | Pajukoski et al. |
| 2005/0128937 A1 | 6/2005 | Akopian |
| 2005/0141545 A1 | 6/2005 | Fein et al. |
| 2005/0200515 A1 | 9/2005 | Cherniakov |
| 2005/0271016 A1 | 12/2005 | Kim et al. |
| 2006/0013332 A1 | 1/2006 | Rayburn |
| 2006/0030364 A1 | 2/2006 | Olesen et al. |
| 2006/0053005 A1 | 3/2006 | Gulati |
| 2006/0244660 A1 | 11/2006 | Ann et al. |
| 2007/0001897 A1 | 1/2007 | Alland |
| 2007/0164902 A1 | 7/2007 | Bang et al. |
| 2007/0189362 A1 | 8/2007 | D'Amico et al. |
| 2007/0213013 A1 | 9/2007 | Kim |
| 2008/0129584 A1 | 6/2008 | Antonik et al. |
| 2008/0260066 A1 | 10/2008 | Cai et al. |
| 2008/0317172 A1 | 12/2008 | Zhang et al. |
| 2009/0237294 A1 | 9/2009 | Shoji et al. |
| 2009/0239551 A1* | 9/2009 | Woodsum ............ H04B 7/086 455/456.1 |
| 2010/0178057 A1 | 7/2010 | Shieh |
| 2010/0254325 A1 | 10/2010 | Narasimhan et al. |
| 2010/0272005 A1 | 10/2010 | Larsson et al. |
| 2010/0303182 A1 | 12/2010 | Daneshrad et al. |
| 2011/0187702 A1 | 8/2011 | Schwartz |
| 2011/0188597 A1 | 8/2011 | Agee et al. |
| 2011/0288823 A1 | 11/2011 | Gupta |
| 2012/0027111 A1 | 2/2012 | Vook et al. |
| 2012/0064916 A1 | 3/2012 | Woodsum |
| 2012/0188058 A1 | 7/2012 | Lee et al. |
| 2012/0212371 A1 | 8/2012 | Chang |
| 2012/0262328 A1 | 10/2012 | Shinonaga et al. |
| 2013/0116561 A1 | 5/2013 | Rothberg et al. |
| 2013/0252568 A1* | 9/2013 | Woodsum ............ H04B 1/1027 455/296 |
| 2013/0344909 A1 | 12/2013 | Davydov et al. |
| 2015/0145716 A1* | 5/2015 | Woodsum ............ G01S 7/292 342/146 |

OTHER PUBLICATIONS

Gabel and Roberts, *Signals and Linear Systems*, 2nd Edition, John Wiley & Sons, New York, pp. 327-332, 345 (1980) (9 total pgs.).

Goshi, et al., "A Compact Digital Beamforming SMILE Array for Mobile Communications," IEEE Transactions on Microwave Theory and Techniques, vol. 52, No. 12, 7 pgs. (Dec. 2004).

Koch, et al., "Increased Capacity per Unit-Cost by Oversampling," ARXIV. Org. Cornell Univ. Library, 201 Olin Library, Cornell University, Ithaca, NY, 27 pgs. (Aug. 31, 2010).

Monzingo and Miller, *Introduction to Adaptive Arrays*, John Wiley & Sons, p. 274 (Total 78 pgs.) (1980).

Pinchon, et al., "A Design Technique for Oversampled Modulated Filter Banks and OFDM/QAM Modulations," In: Lecture Notes in Computer Science, Springer. Heidelberg, Berlin, 10 pgs. (Jan. 1, 2014).

Rao, C.R., "Estimation of Variance and Covariance Components in Linear Models," J. Stat. Assoc., Issue 337, pp. 112-115 (Mar. 1972) (Published online Apr. 5, 2012).

Woodsum, C.M. and Woodsum, H.C., "Optimization of Cascaded Hermetic Transform Processing Architectures via a Chimerical Hybrid Genetic Algorithm," Proceedings of the Sixteenth International Conference on Cognitive and Neural Systems (ICCNS), Boston University, May 30-Jun. 1, 2012 (1 page).

Zhang, et al., "An Oversampled Filter Bank Multicarrier System for Cognitive Radio," Personal, Infoor and Mobile Radio Communications, 2008. PIMRC 2008. IEEE 19th International Symposium on, IEEE. Piscataway, NJ, USA, p. 1-5 (Sep. 15, 2008).

* cited by examiner

DEVICES AND METHODS FOR HERMETIC TRANSFORM FILTERS

CROSS-REFERENCE TO RELATED APPLICATIONS

The present application claims the benefit of U.S. Patent Application No. 62/080,621, filed on Nov. 17, 2014, the content of which is hereby incorporated by reference herein in its entirety.

INCORPORATION BY REFERENCE

All patents, patent applications and publications cited herein are hereby incorporated by reference in their entirety as if fully set forth herein.

TECHNICAL FIELD

Aspects of this disclosure generally relate to the field of signal processing. In particular, aspects of this disclosure relate to filtering of signals using cascaded and/or iterative applications of Hermetic Transforms.

BACKGROUND

The methods according to exemplary embodiments can be illustrated by taking for the sake of pedagogy, applications pertaining to spatial filtering, a field known as array processing. In this context, the Hermetic Transform, as described in U.S. Pat. No. 8,064,408 (which is incorporated by reference as if fully set forth herein), can be utilized in array processing as a substitute for what can be referred to as "Super-Gain" or "Super-Directive" array processing. A goal of such processing is to overcome the classical diffraction limit, wherein angular resolution ("beam-width") is known to be approximately given by the following expression:

$$\delta\theta \sim \lambda/D \quad (1)$$

with $\delta\theta$ being the angular resolution ("beam-width") in radians, $\lambda$ the wavelength of the signal arrival at the array, and D the array characteristic dimension. For example, the above formula generally describes the angular resolution of antenna array of dimension D (assumed to be at least one wavelength in extent) to a radio wave of wavelength $\lambda$ impinging on it, with the antenna oriented (or in the case of a multi-element phased-array, electronically "steered") to have a maximum response in the direction of the source of the radio energy. The diffraction limit on resolution owes to spatial response of the array to signal arrivals from various directions which is characterized by a function known as the "diffraction pattern", or "antenna pattern". The antenna pattern corresponds to the spatial Fourier Transform of the array of element excitations at the individual antenna elements. The diffraction pattern shape is normally comprised of a "main lobe" ("beam") which is steered in some particular direction, and a number of ancillary "side lobes", which respond to energy arriving from directions away from the main lobe of the pattern.

Goals for antenna pattern design typically include (1) making the beam-width as narrow as possible in the main-lobe direction, and (2) mitigating the array response to signals arriving from directions other than that of the main lobe. As a result it is common to "weight" the outputs of individual antenna elements with a "windowing function", such as a Hanning function, to minimize side-lobe responses, at the expense of a modestly broadened pattern main-lobe. Another typical goal of antenna design is to create directive "gain" against radio-frequency noise which is often taken to have a statistical distribution that is isotropic in direction of arrival and uniformly random in terms of wave polarization. For this specific case, the spatial correlation of random noise between elements can be shown to be exactly zero for the case of half-wavelength inter-element separation. Half wavelength spacing also corresponds to the maximum spacing between elements that will produce unambiguous beams having no spatial aliasing ("grating lobes"), and produces as well, the largest useful linear array dimension for an array having N elements, yielding the narrowest diffraction-limited beam width.

Given all of the above assumptions, and representing the signal waveform as complex, it is shown that the maximum directive gain is accomplished by applying complex weights that are the complex conjugates of the arriving waves, the so-called "spatial matched-filter" or what is referred to henceforth as a "matched-filter transform" (MFT) since a set of such weights transforms the signal from element space, to angle/wave-vector space. Let $\underline{\Sigma}$ be a matrix having elements $\Sigma_{ij}$ (with i being the row dimension and j the column dimension) comprised of the complex antenna response of element i and direction of arrival j. The matrix $\underline{\Sigma}$ is by convention referred to as the "array manifold". The array manifold can be calculated (in principle) or measured empirically for any physical array. A matrix form of the MFT (with weighting of array inputs) can be defined according to the following expression:

$$\underline{z} = \underline{\Sigma}^H \underline{W} \underline{X} \quad (2)$$

where $\underline{z}$ is an output beam (complex time series), $\underline{W}$ is a diagonal matrix that contains real weights (e.g., the Hanning function from the previous example) used to control the pattern sidelobes and $\underline{X}$ is a complex time "snapshot" vector (set of synchronous time samples) output from the antenna. Each row in the matrix $\underline{\Sigma}^H$ (e.g., the i-th row) spatially filters out signals mostly from one particular direction (the i-th manifold direction of arrival). For the case of an "ideal manifold", i.e. the signals arriving from various directions have plane wavefronts and are monochromatic, having a single frequency, the Matched Filter Transform corresponds to a Fourier Transform as applied to the spatially sampled aperture, a form sometimes also termed a "Butler Matrix."

For the case where inter-element (antenna) spacing is less than a half-wavelength, the above assumptions generally do not hold. The noise deriving from sources external to the array becomes spatially correlated (element to element), and the beam broadens relative to its nominal value for an array having half wavelength spacing. The Hermetic Transform responds to a need and desire to gain utility by producing high resolution beams with correspondingly high directional gain (gain against externally derived ambient noise) while utilizing small (even ultra-small, sub-wavelength size) multi-element arrays, that are implicitly oversampled spatially. As described in related art by Woodsum, a "decomposable" form of Hermetic Transform can be created by modifying the above expression, Equation (2), to allow the weight matrix $\underline{W}$ to be more generally non-diagonal and complex, imposing a criterion to allow determination of $\underline{W}$ through an optimization procedure. If we construct an input matrix $\underline{X}$, which is the Array Manifold Matrix itself, is constructed, then there is a mathematical statement of the requirement for $\underline{W}$ $$\underline{\Sigma}^H \underline{W} \underline{\Sigma} = \underline{I} \quad (3)$$

The identity matrix corresponds to the discrete form of the spatial delta function, i.e., the criterion is to create a beam that is as close as possible in some optimal sense to that of a spatial delta function. This type of beam cannot be actually achieved in practice, but represents an "ideal" beam with maximum resolution and gain against isotropic noise. The above equation can be solved for $\underline{W}$ and hence for the Hermetic Transform ($\underline{H}$) which is defined as the following:

$$\underline{H} = \underline{\Sigma}^H \underline{W} \quad (4)$$

One very general solution for $\underline{W}$ is given by:

$$\underline{W} = [\underline{\Sigma}\underline{\Sigma}^H]^{\#} \underline{\Sigma}(\underline{I})\underline{\Sigma}^H[\underline{\Sigma}\underline{\Sigma}^H]^{\#} \quad (5)$$

where the identity matrix is shown explicitly; other desired beam responses than I could be substituted. The # symbol indicates the Moore-Penrose pseudo-inverse in Gelb's notation. In practice the pseudo-inverse is often created using the Singular Value Decomposition (SVD). The above method of solving for $\underline{W}$ and therefore for $\underline{H}$, is often chosen in practice because it makes use of the spatial covariance between elements, well known from adaptive beam-forming. The matrix $\underline{W}$, being in general non-diagonal, is effectively a "metric" for a transformed, non-Euclidean complex signal space, in which beams that would not be orthogonal in original, untransformed Euclidean signal space can be orthogonalized, in a least-squares or minimum norm sense, often to within machine precision. There are various other means of creating Hermetic Transforms some of which will be further discussed below.

Summarizing the above discussion, one conventional method of spatial filtering known as beam-forming, involves multiplying each array element by a set of individual real weights, prior to applying an MFT matrix in order to form multiple beams. This process lowers side-lobes levels at the expense of broadening the main lobe of each beam. By contrast, the decomposable Hermetic Transform approach applies a particular, optimized weight matrix ($\underline{W}$) to the array data, prior to applying the MFT, which has the effect of narrowing the beam main-lobe, without increasing side lobe levels. Side-lobe control can be exercised using a more general spatial filtering approach based on the Hermetic Transform. An assumption in this process is the spatial over-sampling of the array, i.e., the array elements are significantly closer together than ½ wavelength (significantly higher spatial sampling than spatial Nyquist). The matrix $\underline{W}$ is solved for in such a fashion as to make a beam in a particular "look direction" $\Omega_0 \sim (\theta_k, \varphi_k)$ that is as close as possible in a minimum norm sense to a delta function beam in angle space. $\delta(\Omega-\Omega_0)$. The solution is called "decomposable" because the transform is composed of the product of two matrices, a MFT part ($\underline{\Sigma}^H$) and a weight matrix part $\underline{W}$. Only the array manifold $\underline{\Sigma}$ is required to create the Hermetic Transform. With hindsight, the problem could have instead been formulated thus: find a matrix $\underline{H}$ such that $$\underline{H}\underline{\Sigma} = \underline{I} \quad (6)$$

in a minimum norm sense. The solution in this case produces the result shown below.

$$\underline{H} = \underline{I}\{\underline{\Sigma}^H[\underline{\Sigma}\underline{\Sigma}^H]^{\#}\} = \underline{\Sigma}^H[\underline{\Sigma}\underline{\Sigma}^H]^{\#} \quad (7)$$

This solution suggests an approach that resembles a solution known from adaptive array theory which termed the Minimum Variance Distortionless Response (MVDR) approach, except that the noise covariance in MVDR has been replaced with a covariance matrix type form derived from the array manifold. A modification of the above result is suggested by the following ansatz. For a weight vector corresponding to one row of the Hermetic Transform—i.e., to form a beam directed in the direction indicated by angles $(\theta_k, \varphi_k)$—apply the weight vector $$w^H(\theta_k, \varphi_k) = \Sigma^H(\theta_k, \varphi_k; \omega)\{[D_k\Sigma]/[D_k\Sigma]^H\}^{\#} \quad (8)$$

where $D_k$ is an operator that zeroes out the column of the matrix $\Sigma$ corresponding to the direction $(\theta_k, \varphi_k)$. Essentially, this procedure is like MVDR, except that the interfering "noise" which is being nulled out consists of all angles of arrival, with exclusion of the "look" direction $(\theta_k, \varphi_k)$. The intuitive explanation is that an MFT beam tries only to correlate (matched-filter to) an arriving signal from a particular look direction with the array manifold response vector associated with that direction, while the Hermetic Transform tries to do the same thing while trying to null out all responses away from the look direction $(\theta_k, \varphi_k)$. In practice, the weight vector produced by the above expression is normalized to unity gain in each particular look direction, for example the direction given by $(\theta_k, \varphi_k)$, with the following procedure $$\underline{w}^H(\theta_k, \varphi_k) >>> \underline{w}^H(\theta_k, \varphi_k)[\underline{w}^H(\theta_k, \varphi_k)\underline{\Sigma}(\theta_k, \varphi_k; \omega)]^{-1} \quad (9)$$

The non-decomposable form has the advantage of being a row-by-row solution for the transform which does not involve inverting or finding the SVD of extremely large matrices; the decomposable form can potentially become computationally unwieldy under some practical conditions. In many cases, when beams are normalized correspondingly, the results for both approaches produce results that are nearly identical, in a numerical sense.

Creation of Spatial Filters Using Hermetic Transforms

Also described in related art, are more general filters, including spatial filters, that can be created using Hermetic Transforms. An elemental transform applies the following mathematical operations:

$$\underline{F} = \underline{H}^{\#} \underline{\Lambda} \underline{H} \quad (10)$$

The complex filter matrix F is of dimension M×M (for an M-element array) and can be interpreted in terms of the beam-transform space operations. First, the Hermetic Transform H is applied to an input signal vector (time snapshot from the array) in order to transform the signal into the wave-vector (or beam) domain. The result is then multiplied by a diagonal matrix $\Lambda$, which applies weights to each "beam". Finally, the pseudo-inverse of the Hermetic Transform ($H^{\#}$) is applied to move back to the spatial domain. If $\Lambda$ is chosen as the identity matrix, the signal would remain unchanged by applying the filter matrix F. If $\Lambda$ is instead chosen as a matrix with all but one non-zero elements, having a "one" on the p-th row diagonal element, the filter will project out of the signal all of the data except for that part of that signal that lies in the Hermetic Transform beam pointed at the p-th look direction. This type of filter transform is referred to as a "simple" or "elemental" spatial "pole" analogous to a pole in the frequency domain response of a time-series filter. Similarly, if for $\Lambda$ a modified identity matrix is chosen that has one diagonal element in the p-th row zeroed out, the transform F will remove data from one beam (look) direction, making a null in that direction. This type of transform is referred to as a "simple" or an "elemental" spatial "zero". By adding weighted cascade products of elemental transforms together, it is possible to make nearly arbitrary spatial filters that can be designed and optimized so as to approach a desired spatial response. A variety of methods can be used to develop a filter cascade from the elemental filter section, in order to achieve desired properties, for example the Genetic Algorithm approach.

Self-Noise Compensation

Extra resolution of the Hermetic Transform comes at the expense of what can potentially be problematic "white noise gain". The use of spatial oversampling removes this problem with respect to background noise (the background noise acquires non-diagonal covariance); however, if the internal self-noise (with diagonal covariance) due to receiving array electronic noise is sufficiently large, another term is added to the transform expression. This term is a "noise conditioning" matrix $\underline{K}$ given by $$\underline{K} = \underline{R}_{\Sigma\Sigma}[\underline{R}_{NN} + \underline{R}_{\Sigma\Sigma}]^{\#} \qquad (11)$$

where $\underline{R}_{NN}$ is the internal self-noise covariance, and $R_{\Sigma\Sigma}$ is a scaled manifold covariance ($=c\ \underline{\Sigma}\underline{\Sigma}^H$). The conditioned Hermetic Transform is in this case given by the following expression.

$$\underline{H} = \underline{\Sigma}^H \underline{W} \underline{K} \qquad (12)$$

This procedure filters each signal arrival as corrupted by self-noise, with $\underline{K}$, in such a fashion as to make the conditioned sum of signals plus internal noise as close as possible in a minimum norm sense, to the signal arrivals alone. In practice, a relevant signal to noise ratio can be assumed for scaling purposes, and since internal self-noise can be measured by removing stimulus to the array, and is effectively a stationary random process, the creation of a conditioning matrix becomes a one-time issue (not a real-time issue).

Application of noise conditioning is often unnecessary, the need for it being completely dependent on the specifics of the problem at hand. Measurement of internal, electronic noise is usually not difficult, and the above technique can be made robust to uncertainty in this parameter, as well.

The principles and method construction for Hermetic Transform used in frequency spectrum analysis are similar to those outlined above. The manifold matrix is replaced by a matrix of column vectors where each column vector is a complex sinusoidal signal computed at instants of time that are multiples of the sampling period $T_s$, where $T_s=1/$(sampling frequency), for a set of m angular frequencies ($\omega_m$ which essentially correspond to the angles of arrival in the spatial version of the transform. The "manifold" element for row—n and column—m is given by:

$$\underline{\Sigma}(n,m) = \exp[i\ \omega_m n T_s] \qquad (13)$$

Transforms and filters are formed using the precisely identical formulas as for the spatial transform, except for making use of the appropriate "manifold" for frequency spectrum analysis (Equation 13). Hermetic Transforms also have a time-domain form, wherein the manifold matrix E is constructed of Fourier or Hermetic (frequency) Transforms of time-shifted versions of a replica signal, and the transform developed has the effect of replacing time-domain replica correlation with a transform producing correlations with much higher than conventional time resolution (e.g. U.S. Patent Application Publication No. US20150145716A1, "Radar using Hermetic Transforms")

Additional background is provided in related art U.S. Pat. Nos. 8,948,718; 8,064,408; 9,154,353; 8,559,456; and 9,154,214, as well as (1) "Optimized Hermetic Transform Beam-forming of Acoustic Arrays Via Cascaded Spatial Filter Arrangements Derived Using A Chimerical Evolutionary Genetic Algorithm" Harvey C. Woodsum and Christopher M. Woodsum, *Proceedings, International Congress on Acoustics, ICA*-13, June 2013—Montreal, Canada; and (2) "Optimization of Cascaded Hermetic Transform Processing Architectures via a Chimerical Hybrid Genetic Algorithm", C. M. Woodsum and H. C. Woodsum, *Proceedings of the Sixteenth International Conference on Cognitive and Neural Systems (ICCNS)*, Boston University, May 30-Jun. 1, 2012.

SUMMARY

In one or more exemplary embodiments, a method comprises applying one or more first hermetic filters to an interval of data to produce one or more filtered subintervals of data, wherein the one or more first hermetic filters are constructed from a hermetic function for the interval; and applying one or more second hermetic filters to the one or more first filtered subintervals of data to produce one or more second filtered subintervals of data, wherein the one or more second hermetic filters are constructed from a hermetic function for the one or more first filtered subintervals.

In one or more exemplary embodiments, the method further comprises applying one or more third hermetic filters to the one or more second filtered subintervals of data to produce one or more third filtered subintervals of data, wherein the one or more third hermetic filters are constructed from a hermetic function for the one or more second filtered subintervals. In one or more exemplary embodiments, the one or more second hermetic filters comprise two or more second hermetic filters applied iteratively. In one or more exemplary embodiments, the one or more second hermetic filters comprise two or more second cascaded hermetic filters.

In one or more exemplary embodiments, the interval comprises a frequency band; the hermetic function for the interval comprises a discrete hermetic transform; the hermetic function for the one or more first filtered subintervals comprises a discrete hermetic transform; the one or more first hermetic filters comprise one or more first hermetic band-pass filters; and the one or more second hermetic filters comprise one or more second hermetic band-pass filters.

In one or more exemplary embodiments, the interval comprises a plurality of time samples; the hermetic function for the interval comprises a discrete hermetic transform; the hermetic function for the one or more first filtered subintervals comprises a discrete hermetic transform; the one or more first hermetic filters comprise one or more first sector limiting spatial filters; and the one or more second hermetic filters comprise one or more second sector limiting spatial filters.

In one or more exemplary embodiments, the interval comprises a time interval; the hermetic function for the first interval comprises a hermetic matched filter; the hermetic function for the one or more first filtered subintervals a hermetic matched filter; the one or more first hermetic filters comprise one or more first time interval filters; and the one or more second hermetic filters comprise one or more second time interval filters.

In one or more exemplary embodiments, the one or more second filtered subintervals of data are produced for at least one of beam-forming, direction finding, spectrum analysis, or frequency estimation. In one or more exemplary embodiments, the one or more second filtered subintervals of data are produced for at least one of time of arrival of arrival processing, time-difference of arrival processing, or time delay estimation. In one or more exemplary embodiments, the one or more second filtered subintervals of data are produced for at least one of sensor, communications, radar, sonar, navigation, signal locator systems, and imaging systems making use of time, frequency, or spatial transforms.

In one or more exemplary embodiments, a devices comprises one or more first hermetic filters configured to produce one or more first filtered subintervals of data based on to an interval of data, wherein the one or more first hermetic filters are constructed from a hermetic function for the first interval; and one or more second hermetic filters configured to produce one or more second filtered subintervals of data based on the one or more first filtered subintervals of data, wherein the one or more second hermetic filters are constructed from a hermetic function for the one or more first filtered subintervals.

In one or more exemplary embodiments, the devices further comprises one or more third hermetic filters configured to produce one or more third filtered subintervals of data based on the one or more second filtered subintervals of data, wherein the one or more third hermetic filters are constructed from a hermetic function for the one or more second filtered subintervals. In one or more exemplary embodiments, the one or more second hermetic filters comprise two or more second hermetic filters configured to be applied iteratively. In one or more exemplary embodiments, the one or more second hermetic filters comprise two or more cascaded second hermetic filters.

In one or more exemplary embodiments, the interval comprises a frequency band; the hermetic function for the first interval comprises a discrete hermetic transform; the hermetic function for the one or more first filtered subintervals comprises a discrete hermetic transform; the one or more first hermetic filters comprise one or more first hermetic band-pass filters; and the one or more second hermetic filters comprise one or more second hermetic band-pass filters.

In one or more exemplary embodiments, the interval comprises a plurality of time samples; the hermetic function for the interval comprises a discrete hermetic transform; the hermetic function for the one or more first filtered subintervals comprises a discrete hermetic transform; the one or more first hermetic filters comprise one or more first sector limiting spatial filters; and the one or more second hermetic filters comprise one or more second sector limiting spatial filters.

In one or more exemplary embodiments, the interval comprises a time interval; the hermetic function for the interval comprises a hermetic matched filter; the hermetic function for the one or more first filtered subintervals a hermetic matched filter; the one or more first hermetic filters comprise one or more first time interval filters; and the one or more second hermetic filters comprise one or more second time interval filters.

These and other aspects and embodiments of the disclosure are illustrated and described below.

DETAILED DESCRIPTION OF EXEMPLARY EMBODIMENTS

Figure 1:
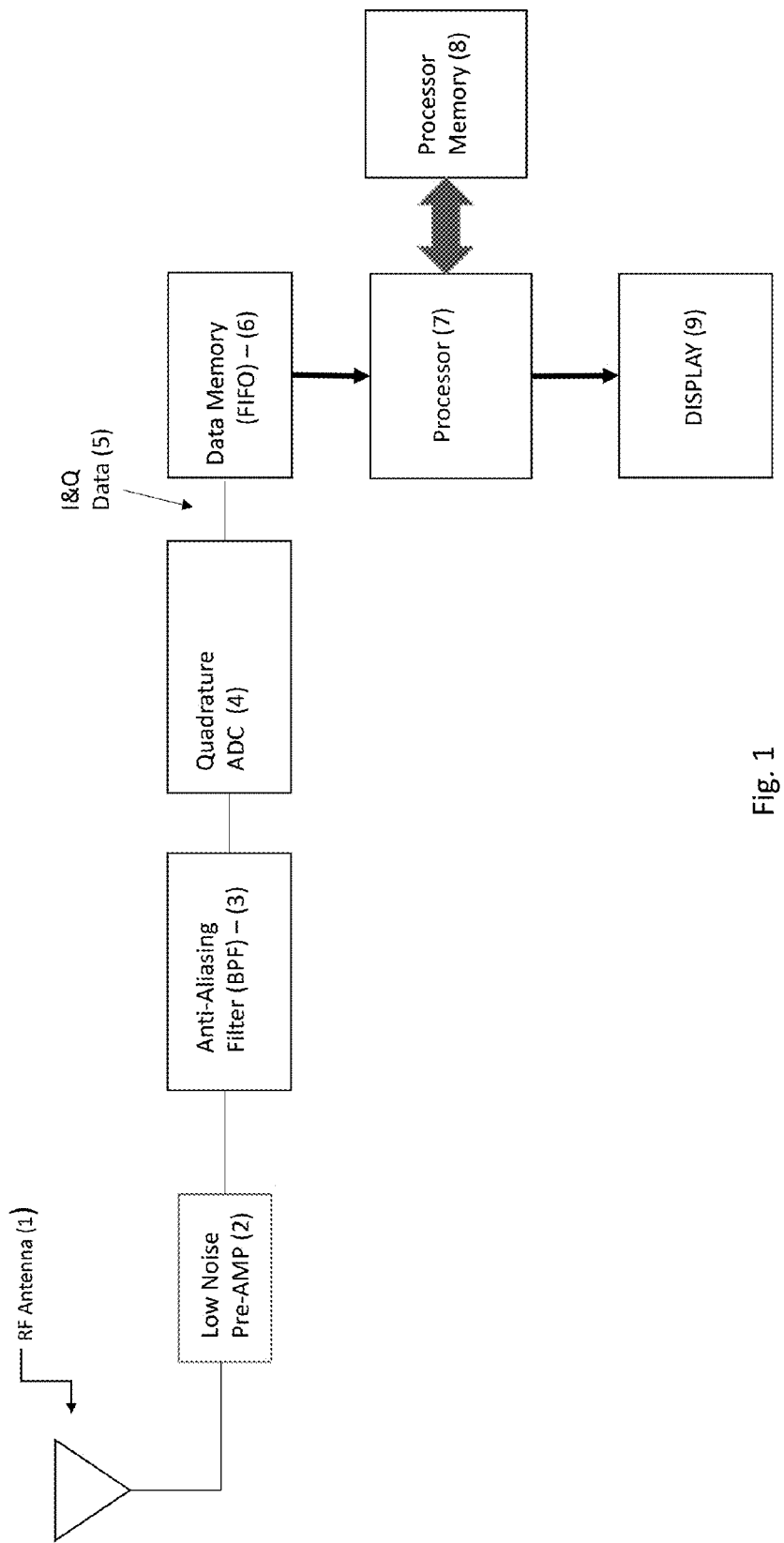
FIG. 1 illustrates a hermetic transform filtering device according to an exemplary embodiment.

Aspects of this disclosure relate to filtering of signals using devices and methods that are based on cascaded and/or iterative applications of Hermetic Transforms. In one or more exemplary embodiments, the disclosed devices and methods provide enhanced performance over both Fourier Domain forms of filtering, as well as Hermetic Filtering as described in related art by Woodsum in U.S. Pat. No. 8,948,718, "Devices and Methods using the Hermetic Transform."

From the expressions discussed above in the background relating to Hermetic Transform, it is seen that the Hermetic Transform is a function of the array manifold, for example in the case of an array manifold, the Hermetic Transform is a function of the specific "look directions" (angles) comprising the spatial filtering sector(s). Similarly, the solution for a frequency-domain Hermetic Transform is function of the selection of frequencies (e.g. the processing band) being processed.

Exemplary embodiments rely on a discovery that Hermetic Transform filtering as regard the array processing problem can be utilized in stages to narrow the field of view (range of beam angles) and thereby create transforms that process successively narrower spatial sectors, with higher resolution transforms and correspondingly narrower beams being generated at each stage. By mathematical analogy and by experimentation, it has also been discovered that these same principles work in the application of Hermetic Transforms to frequency-domain analysis and in time-correlation analysis.

The Hermetic Transform produces resolution that depends on a manifold $\Sigma$. The algorithms described above in equations above (equations 3 and 5, 8 and 9) are designed to create beams (or frequency 'bins') that are as close as possible to a delta function, and that are orthogonal. The resolution and the discrimination power of the transform produced by applying the above procedures is dependent on a precise range of frequencies (or spatial frequencies in the case of beam-forming) spanned by manifold and by the degree of oversampling. As a result, a "zoom" procedure has been discovered which involves filtering the signal in stages to narrow the bandwidth (range of frequencies), or range of angles for the case of beam-forming, to create a new higher resolution DHT at each stage. By applying this procedure in a cascade or iterative fashion, a set of processing bands, each band having an associated DHT transform, is produced. Each DHT produced has higher resolutions than those of the prior stages. Exemplary embodiments described here make use of this discovery to create higher resolution beam-forming and/or spectrum analysis, and to create higher performance devices and systems that exploit this higher resolution.

An example embodiment of a digital filtering system that makes use of the method as outlined above is described herein. The embodiment pertains to spectrum analysis of an oversampled signal (vis a vis the Nyquist sampling rate) in order to derive the benefit of higher resolution in frequency than could otherwise be achieved. In one or more exemplary embodiments, the methods and principles disclosed here can used in order to achieve to a variety of useful applications.

Figure 2:
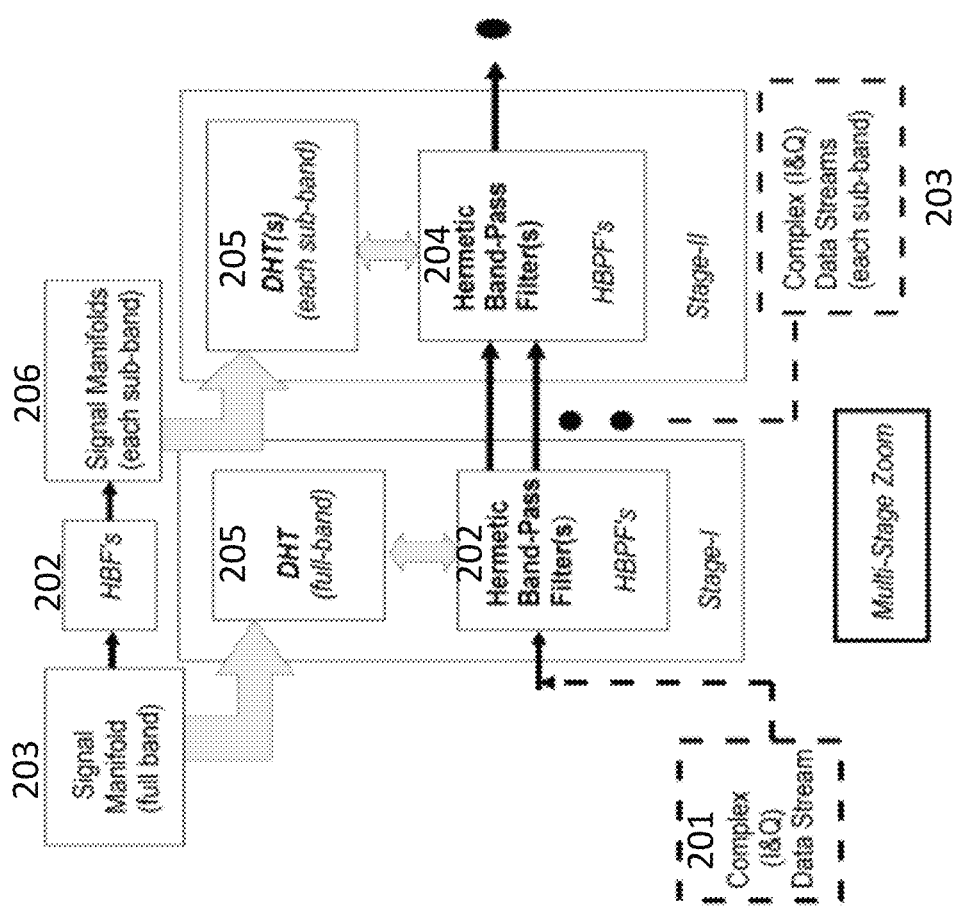
FIG. 2 illustrates a device for performing "Zoom" Hermetic (Transform) processing according to an exemplary embodiment.

The block diagram of FIG. 1, when combined with the block diagram of FIG. 2, presents a sample embodiment of one specific application, that of Radio Frequency Spectrum Analysis. Frequency Spectrum Analysis as a general topic has widespread application within the context of many types of systems, for example in Doppler Filtering for RADAR and sonar, as well as in multi-channel/multi-frequency signaling in modern communications systems. Spectrum Analyzers are devices which make use of Frequency Spectrum Analysis, that can operate in either a standalone capacity, or in conjunction with other devices or systems. One metric of the utility of a spectrum analyzer is its frequency resolution, which in conventional designs, is limited by the Fourier Transform "uncertainty principle" between the length of a block of sampled data being analyzed and the frequency resolution of the Fourier Transform channels ("bins"). With oversampling of the signal, one can use the same principles to accomplish filtering.

First we describe the embodiment generally, moving from left to right in FIG. 1. A radio-frequency signal is converted to an electrical signal at an antenna (1) as shown. A low-noise amplifier (2) optionally boots the electrical signal in order to mitigate the effect of internal electrical noise within the system. Next, the signal is passed through an analog anti-aliasing, band-pass filter (3), so that the signal can be subsequently digitized. The next step is to convert the electrical signal into the form of digital data. In the embodiment shown the digitization is accomplished by (4) a Quadrature Analog to Digital Converter (ADC) so that the digital representation of the signal is represented as N-bit binary (or equivalent, e.g. hexadecimal) complex, In-Phase and Quadrature data words (5). Alternatively, for example, the data could be converted to real digital data and converted to complex format via a Hilbert Transform. In order to accomplish the extra resolution in frequency analysis with the Hermetic Transform, the signal passing out of the anti-aliasing filter is oversampled where the sampling rate is substantially higher than twice the signal bandwidth.

In the embodiment presented in FIG. 1, the digitized data is stored in a data memory, for example a First-In/First-Out memory (6) for subsequent transfer to a computer program residing in a Processor (e.g., a Digital Processor). The Processor (7) executes the multi-stage Hermetic Transform filtering method as describe herein. In the embodiment shown the execution of this method is governed by a Program which resides in the Processor Memory (8). Equivalently, the processor could, for example, be a replaced by a logic-gate computing equivalent, for example a Field Programmable Gate Array or FPGA which is programmed to perform the procedure and method outline below.

The block diagram FIG. 2, presents a device for performing what we have termed "Zoom" Hermetic (Transform) processing according to an exemplary embodiment. The diagram of FIG. 2) as shown is for the same case of a case frequency spectrum analysis, but is equally applicable to spatial processing (beam-forming) applications, and to time domain processing as well. A stream of In-Phase (I) and Quadrature (Q) digital data (201) from the FIFO memory (shown in FIG. 1) is fed to the processor (complex data samples). Next, one or more Hermetic Band-Pass Filter(s) or HBPF's or HBF's (202), are applied to the incoming data stream to limit the frequency content of the signal for each band of interest. The frequencies in each band are low in comparison to the sampling frequency with the signals from each band being greatly oversampled in comparison to the Nyquist rate. The HBPF (202) is constructed using the previously described procedure that makes use of a weighted combination of simple filters, the latter being each constructed according to the form of Equation 10, above, using the DHT (205) for the full-band. The signal data are taken in blocks, which comprise a vector that is multiplied by the relevant Filter Matrix. The signal manifold (203) initially contains frequencies that range over the entire sampling band. The DHT (205) for the full-band is constructed from the signal manifold (203), as described in equations 3-10 above. Each HBPF (202) produces an independent channel of data (stream) (203) that is subsequently processed using the next stage of HBPF's (204). The frequencies contained in the manifold for each stage of processing (e.g., manifold 206 for stage II) are selected to correspond to the frequency range for the specific band being processed; the signal basis is down selected from the previous band and filtered using the same HBF (e.g., HBPF 202) as the previous band. A new DHT (e.g., DHT 205) is created for each band and then used to create a subsequent HBPF (e.g., HBPF 204). For a specific final band of interest, the result of the cascade of filters applied through the various stages of processing to the signal, can be captured in a single matrix that filters an incoming signal down to the processing band. The band-specific DHT can then be applied to determine a precise complex spectral representation.

As another example application, the data rate of multiple frequency channel signaling can be enhanced by virtue of the increased resolution of the Hermetic Transform as compared with related art U.S. Pat. No. 9,154,353. The linearity of the described proprocessing in the present exemplary embodiments means that the multi-stage ("zoom") filtering process retains capability for capturing individual channel signal amplitude and phase, for example in analyzing Quadrature-Amplitude Modulated (QAM) modulated basis function using Hermetic Orthogonal Frequency Division Multiplexing (OFDM). The resulting data can then be utilized by a baseband processor or application processor for further processing. The enhanced resolution provided by the one or more exemplary embodiments can further enhance data rate by allowing even more channels to be resolved than in the related art H-OFDM system, thus further increasing the utility of one or more exemplary embodiments described herein.

Figure 3:
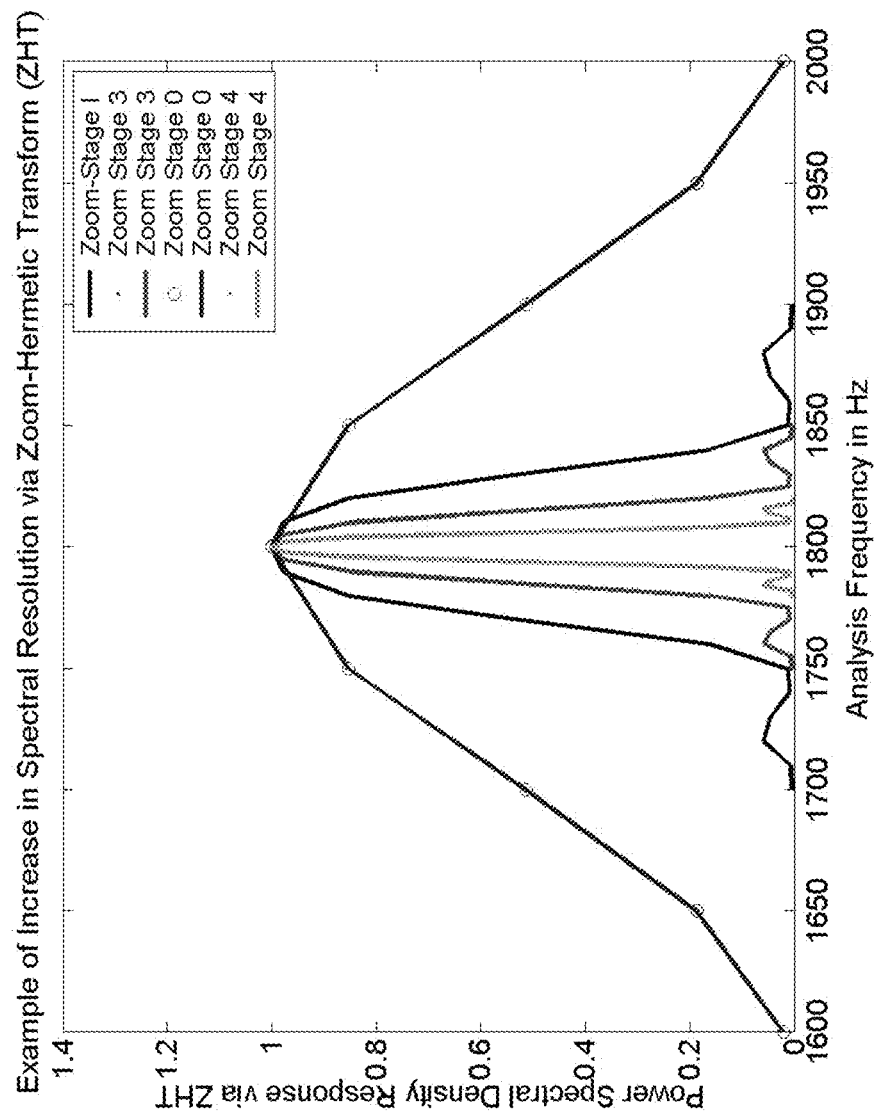
FIG. 3 illustrates an example of the resolution advantage that can be gained through subsequent stages of processing for the case of a single sinusoidal frequency.

FIG. 3 shows an example of the resolution advantage that can be gained through subsequent stages of processing for the case of a single sinusoidal frequency. The problem being simulated is that of a tone being transmitted over audio frequencies, for example over an old-fashioned analog telephone channel. The signals' frequency is in the vicinity of 1800 Hz. The sampling rate is 44,100 samples per second, which is nominal for computer audio sound chips.

The initial baseline DHT result is shown by the broadest curve above, which presents power spectrum (square of the transform output magnitude). This curve corresponds to the case where the DHT is made using all of the frequencies in the original unfiltered band. The rest of the curves shown subsequent stages of filtering and transformation based on the signal basis sets (frequency ranges) corresponding to the HPF outputs at each stage. The comparison of resolution is striking.

Figure 4:
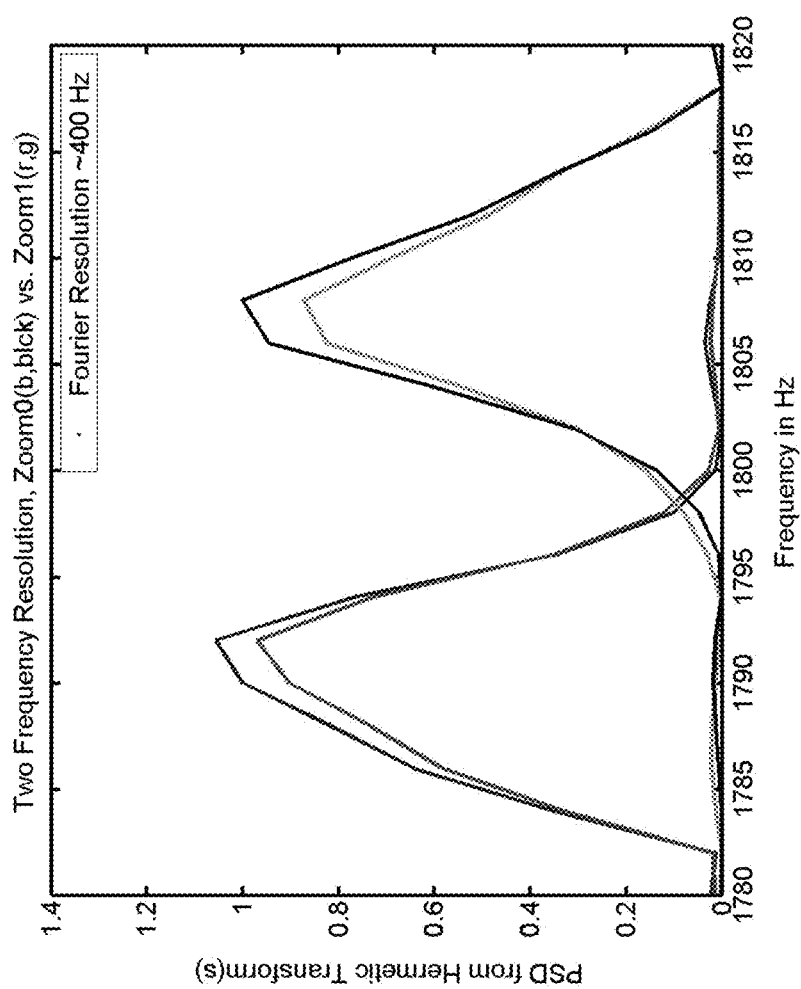
FIG. 4 illustrates a composite signal consisting of the sum of two sinusoids has been processed using the same procedure in order to prove that the DHT at the lowest level does in fact achieve much higher multi-signal resolution, and to establish linearity.

Referring to FIG. 4, a composite signal consisting of the sum of two sinusoids has been processed using the same procedure in order to prove that the DHT at the lowest level does in fact achieve much higher multi-signal resolution, and to establish linearity.

In the figure, the left and right curves with the greater amplitude present the result of the DHT derived from the cascaded basis manifold corresponding to the final band-pass filter. The frequencies were 1790 and 1810 Hz. The curves on the left and right with lower PSD resulted from an approximation procedure which attempted to derive the required band-pass signal filtering and associated DHT in one single step. The curves are nearly the same and have similar resolution. One can see there are frequency spacings near those chosen here which would produce orthogonal signaling, i.e., the peak of the response to one signal corresponds to a zero response region for the other and vice versa. Therefore the result is seen to be applicable to multi-frequency signaling, such as a system like Hermetic Transform based OFDM signaling (H-OFDM).

The exemplary embodiments described above pertains to frequency analysis. Embodiments for spatial and temporal filtering are now presented. In one or more embodiments, the devices and methods described herein can be applied to frequency analysis filtering, spatial frequency filtering (beam-forming and array processing), and to time-interval (temporal) filtering/Hermetic Matched Filtering.

Figure 5:
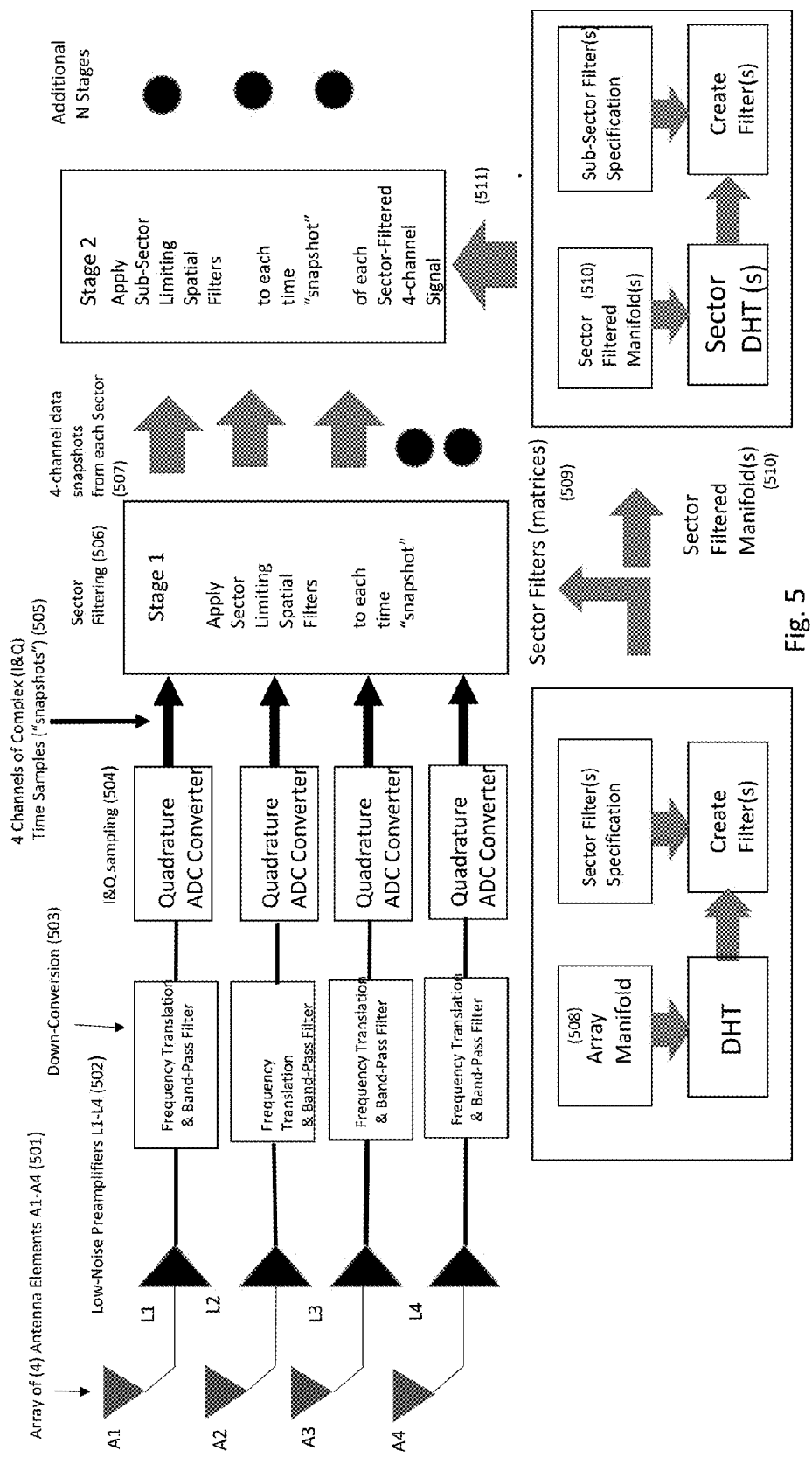
FIG. 5 presents a block diagram which embodies a spatial filtering embodiment pertaining to a processing of signals from a four-element antenna array according to an exemplary embodiment.

FIG. 5 presents a block diagram which embodies a spatial filtering embodiment pertaining to a processing of signals from a four-element antenna array. A radio frequency signal comprised of signals emanating from emitters at various locations remote from the array. The individual antenna signals are pre-amplified by low noise amplifiers and then frequency translated, band-pass filtered to a desired intermediate or baseband frequency (FIG. 5 items 501-503). Next, the 4 channel channels signals are synchronously sampled in quadrature to create 4 channels of M-bit, In-Phase and Quadrature (I&Q), or equivalently, complex, digital data in Quadrature ADC Converters 504 to produce 4 Channels of Complex (I&Q) Time Samples ("snapshots") (505). A set of sector limiting filters (506) are constructed as shown from the Array Manifold and the Discrete Hermetic Transform (DHT) constructed from the manifold, as described in equations 3-10. The Array Manifold represents the response of the array to signals arriving at the array from a pre-determined set of directions, which for purposes of illustration, is assumed to span the entire range of azimuth and elevation viewed by the array. The methods of constructing the array manifold and of constructing Hermetic Transforms for spatial processing are described in the related art by Woodsum. The Sector Filters (509) are at the Sector Filtering stage (506) in the Figure, and are designed to limit the arrivals present in the sector filter output(s) (507) to a spatial sector, e.g., a range of arrival angles. The input (505) to each spatial sector filter (509) is a set of time snapshots of 4-channel signals that have been synchronously sampled in I&Q. The output (507) of each Sector Filter is also a set of time snapshots of 4-channel signals, with the content of the signals containing only signals arriving from the desired sector. The original Array Manifold (508) is filtered using the same set of Sector Filters (509) and then used to construct a manifold (510) for a second stage of processing. Hermetic Transforms are created from each sector-filtered manifold (510). A set of sub-sector filters (matrices) (511) are then created using the same procedure to further narrow each of the sectors so as to contain an even narrower range of angles. A number (N) of such processing stages comprises the entire chain of what we term the "zoom" Hermetic Filtering. As with the case of frequency analysis, resolution improves at each stage until an asymptotic limit is reached.

The stages of processing can be iteratively applied to a data buffer or processed in sequential "pipeline" fashion. In an exemplary embodiment, the array manifold can, for example, be created via calibration of the array using actual signals impinged on the array, or via an electromagnetics model. The creation of the DHTs and filters at each stage can be done entirely offline, a priori, and thus there is no substantial computational burden for real-time operation beyond the application of the filter stages, which are each complex matrix multiples. Processing of this type can be readily implemented not only in general purpose processors, but also in digital signal processing chips, Field Programmable Gate Arrays (FPGAs), and/or in Graphic Processing Units (GPUs), each of which are to various degrees optimized for both vector/matrix operations and parallel processing.

The embodiment for radio-frequency antenna systems presented here can be adapted to any number of other problems, for example acoustic arrays for sonar, seismic, and/or air-acoustic microphone applications according to one or more exemplary embodiments.

In an analogous fashion, in one or more exemplary embodiments, time domain filtering can be used to increase time resolution in Hermetic Matched Filtering. As described in the related art by Woodsum, the analogous equation to equation 3 for the Hermetic Matched Filter (HMF) is the following:

$$\underline{F}^{\#}\underline{\Omega}\underline{F}=\underline{I}$$

This is the Fourier domain analog of the conventional Hermetic Transform processing used in frequency analysis. Here the HMF manifold $\underline{F}$ is a matrix with columns that are each Discrete Time Fourier Transforms of time-shifted versions of a signal replica. The weight matrix $\underline{\Omega}$ is to be solved for using the standard methods of linear algebra, via pseudo-inverse methods. The Hermetic Matched filter is equal to $\underline{F}^{\#}\underline{\Omega}$. Here $\underline{I}$ is the identity matrix.

Figure 6:
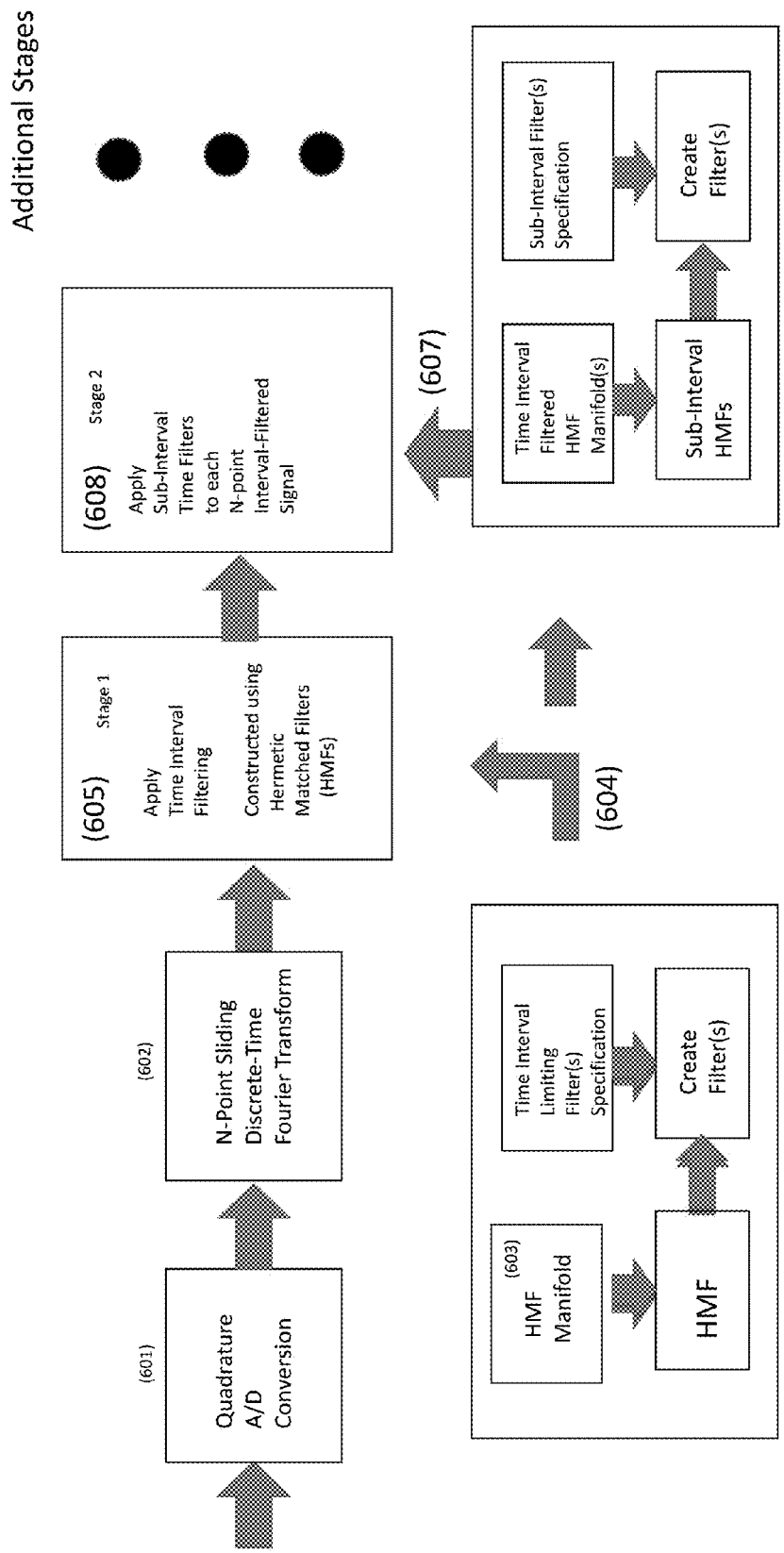
FIG. 6 illustrates a time domain filtering used to increase time resolution in Hermetic Matched Filtering according to one or more exemplary embodiments,.

As shown in the FIG. 6, quadrature sampled I&Q data produced by Quadrature A/D Conversion 601 are mapped to the frequency domain using a sliding Discrete Time Fourier Transform (602), which effectively produces a complete N point transform on blocks of N/2 data points every sample. The HMF manifold (603) is used to create a time-interval filters in an analogous fashion to that for the frequency analysis and spatial analysis case examples. A set of time-interval filters (604) are applied as shown as a first stage (605), producing a set of N-point Fourier Transforms of the original signals which contain only events within particular time intervals. The HMF manifold (603) is similarly time-interval filtered and utilized to produce sub-interval time filters (607) that are applied at stage 2 (608), by producing a Time Interval Filtered HMF Manifold(s) and sub-interval HMFs, as shown. A set of (N) such stages can be applied, with the final interval signals and Hermetic Matched Filters producing higher resolution than would be the case for a single stage of Hemetic Matched Filtering.

The exemplary embodiments disclosed include both methods and means of creating devices and systems utilizing these methods. Digital Filtering in its most general sense includes processing of signals in the time, frequency, and/or spatial domains. Examples include spatial beam-forming, spatial direction finding, frequency spectrum analysis, and other and various types of useful systems that can incorporate such filtering, such as signal data communications, antenna processing, acoustic arrays, radar, and sonar, and imaging systems. The embodiment(s) described are not meant to limit or constrain the methods and systems to implementations that are strictly based on digital signal processing (the approaches herein described), as analog methods can also be used to implement the exemplary embodiments described herein in a variety of forms.

The exemplary embodiments described herein are generally applicable to filtering in space, frequency, and time. Each domain has a corresponding manifold matrix which defines the Hermetic Transform processing, in order to accomplish higher space, frequency, and time resolution in than would be possible using single stage Hermetic correlators or conventional Fourier (e.g. FFT) processing.

The Hermetic processing as described above can be implemented in any general or specific purpose processor or group of processors, and can be implemented with hardware and/or software logic, and can be part of a baseband processor or applications processor. The method may, for example, be applied in either an iterated fashion, or may be cascaded between multiple processors, for example in a "pipelined" or a "systolic array" fashion. In addition, since the manifold is known a priori from either calibration or modeling, in one or more exemplary embodiments, the iterated embodiment can be performed offline and the resulting filters and transforms pre-stored, so as to create the desired higher resolution filters and Hermetic Transforms appropriate for direct use in a system without any burden to real-time processing. Additionally, in one or more exemplary embodiments, the system can self-calibrate at various times, for example in the case of arrays which deform in some un-predictable fashion, e.g. towed sonar acoustic arrays are flexible and self-calibrate or otherwise determine its own shape parameters and associated manifold information.

What is claimed:

1. A method of signal filtering comprised of a plurality of processing stages, achieving successively greater frequency resolution at each of the plurality of processing stages, and employing Hermetic Transforms within each of the plurality processing stages, comprising:

applying in a first stage, using one or more processors, one or more first-stage hermetic filters to an interval of sampled data and applying spectral shaping using Hermetic Transforms, complex weight matrices, and Hermetic Transform Pseudo-Inverse matrices to produce one or more filtered subintervals of data, wherein the one or more first-stage hermetic filters are constructed from a hermetic function of frequencies present in signals contained within the first interval; and applying in a second stage, using the one or more processors, one or more second-stage hermetic filters to the one or more first filtered subintervals of data to produce one or more second filtered subintervals of data, wherein the one or more second hermetic filters are constructed from a hermetic function of frequencies present within the one or more first filtered subintervals, wherein a frequency resolution achieved in the second stage is greater than a frequency resolution achieved in the first stage.

2. The method of claim 1, further comprising:

applying in a third stage, using the one or more processors, one or more third-stage hermetic filters to the one or more second filtered subintervals of data to produce one or more third-stage filtered subintervals of data, wherein the one or more third-stage hermetic filters are constructed from a hermetic function of frequencies present within the one or more second filtered subintervals.

3. The method of claim 1, wherein the one or more second-stage hermetic filters comprise two or more second hermetic filters applied iteratively.

4. The method of claim 1, wherein the one or more second-stage hermetic filters comprise two or more cascaded second hermetic filters.

5. The method of claim 1, wherein:

the interval comprises time series data containing a frequency band;

the hermetic function for the interval comprises applying in one or more steps a discrete hermetic transform, a weight matrix, and a hermetic transform pseudo-inverse the one or more first hermetic filters comprise one or more first hermetic band-pass filters; and the one or more second hermetic filters comprise one or more second hermetic band-pass filters.

6. The method of claim 1, wherein:

the interval comprises a plurality of time samples and the first-stage hermetic filters and the second-stage hermetic filters operate to filter time-sampled data on an interval with respect to frequency content and spectral shaping;

the interval with respect to frequency content and spectral shaping comprises a plurality of time samples from a spatially sampled array of antenna or microphone elements;

the one or more first-stage hermetic filters comprise one or more first sector limiting spatial filters; and the one or more second-stage hermetic filters comprise one or more second sector limiting spatial filters.

7. The method of claim 1, wherein:

the interval comprises a time interval;

the hermetic function for the first interval comprises a hermetic matched filter that correlates with one or more of a known signal replica or template;

the hermetic function for the one or more first filtered subintervals a hermetic matched filter;

the one or more first hermetic filters comprise one or more first time interval filters; and the one or more second hermetic filters comprise one or more second time interval filters.

8. The method of claim 1, wherein the one or more second filtered subintervals of data are produced for at least one of beam-forming, direction finding, spectrum analysis, or frequency estimation.

9. The method of claim 1, wherein the one or more second filtered subintervals of data are produced for at least one of time of arrival of arrival processing, time-difference of arrival processing, or time delay estimation.

10. The method of claim 1, wherein the one or more second filtered subintervals of data are produced for at least one of sensor, communications, radar, sonar, navigation, signal locator systems, and imaging systems making use of time, frequency, or spatial transforms.

11. A signal filtering device for signal filtering comprised of a plurality of processing stages, achieving successively greater frequency resolution at each of the plurality of processing stages, and employing Hermetic Transforms within each of the plurality of processing stages, comprising:

memory storing instructions;

one or more processors configured to execute the instructions to cause:

one or more first-stage hermetic filters in a first stage to produce one or more first filtered subintervals of data based on to an interval of sampled data and by applying spectral shaping using Hermetic Transforms, complex weight matrices, and Hermetic Transform Pseudo-Inverse matrices, wherein the one or more first-stage hermetic filters are constructed from a hermetic function of frequencies present in signals contained within the first interval; and one or more second-stage hermetic filters to produce one or more second filtered subintervals of data based on the one or more first filtered subintervals of data, wherein the one or more second-stage hermetic filters are constructed from a hermetic function of frequencies present in signals contained within the second interval for the one or more first filtered subintervals, wherein a frequency resolution achieved in the second stage is greater than a frequency resolution achieved in the first stage.

12. The device of claim 11, where the one or more processors is further configured to cause:

one or more third-stage hermetic filters to produce one or more third-stage filtered subintervals of data based on the one or more second filtered subintervals of data, wherein the one or more third-stage hermetic filters are constructed from a hermetic function of the frequencies present in the signals contained within the second interval for the one or more second filtered subintervals.

13. The device of claim 11, wherein the one or more second hermetic filters comprise two or more second hermetic filters configured to be applied iteratively.

14. The device of claim 11, wherein the one or more second-stage hermetic filters comprise two or more cascaded second hermetic filters.

15. The device of claim 11, wherein:
the interval comprises a set of time samples containing a frequency band;

the hermetic function for the first interval comprises applying in one or more steps a discrete hermetic transform, a weight matrix, and a hermetic transform pseudo-inverse;

the one or more first hermetic filters comprise one or more first hermetic band-pass filters; and the one or more second hermetic filters comprise one or more second hermetic band-pass filters.

16. The device of claim 11, wherein:
the interval comprises a plurality of time samples;

the hermetic function for the first interval comprises applying in one or more steps a discrete hermetic transform, a weight matrix, and a hermetic transform pseudo-inverse;

the hermetic function for the one or more first filtered subintervals comprises applying in one or more steps a discrete hermetic transform, a weight matrix, and a hermetic transform pseudo-inverse;

the one or more first hermetic filters comprise one or more first sector limiting spatial filters; and the one or more second hermetic filters comprise one or more second sector limiting spatial filters.

17. The device of claim 11, wherein:
the interval comprises a time interval;

the hermetic function for the first interval comprises a hermetic matched filter;

the hermetic function for the one or more first filtered subintervals a hermetic matched filter;

the one or more first hermetic filters comprise one or more first time interval filters; and the one or more second hermetic filters comprise one or more second time interval filters.

\* \* \* \* \*